United States Patent [19]

Munns

[11] 3,976,200

[45] Aug. 24, 1976

[54] BICYCLE WALL RACK

[76] Inventor: Robert K. Munns, 1661 W. 83rd Ave., Denver, Colo. 80221

[22] Filed: Aug. 13, 1975

[21] Appl. No.: 604,224

[52] U.S. Cl. ................................. 211/18; 211/100
[51] Int. Cl.² ............................................. B62H 3/02
[58] Field of Search ............... 292/99, 198; 211/17, 211/18, 19, 21, 99, 100

[56] References Cited

UNITED STATES PATENTS 610,656  9/1898  Martin .................................. 211/18

FOREIGN PATENTS OR APPLICATIONS 12,927  8/1896  United Kingdom ................... 211/18
8,915  4/1903  United Kingdom ................... 211/17

*Primary Examiner*—Roy D. Frazier
*Assistant Examiner*—Robert W. Gibson, Jr.
*Attorney, Agent, or Firm*—W. Britton Moore

[57] ABSTRACT

A bicycle rack mountable on a wall surface and having a pair of projecting fork supporting arms rotatable from depending collapsed to horizontal bicycle supporting positions and provided with a latching mechanism for retaining the arms in supporting position whereby a bicycle is supported in erect position relative to the wall surface.

9 Claims, 4 Drawing Figures

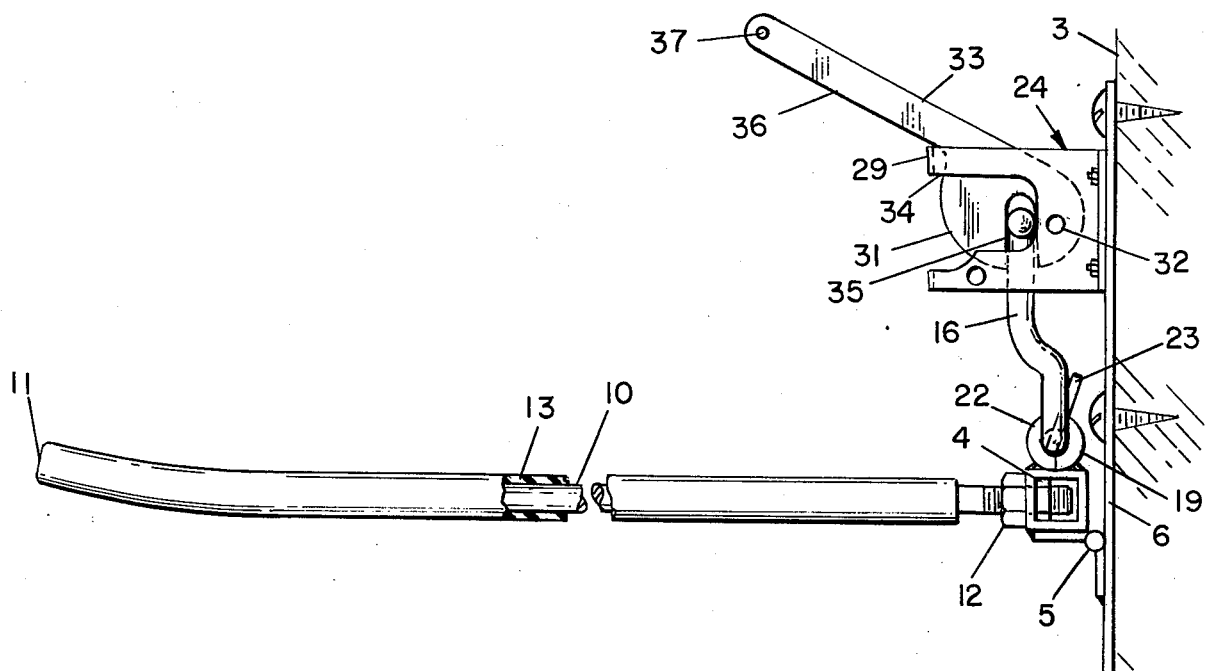
FIG. 3
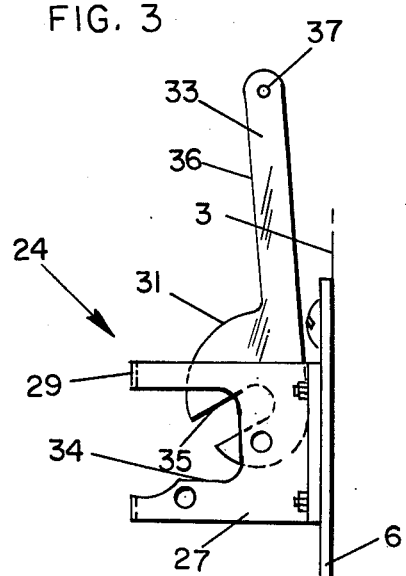
FIG. 4
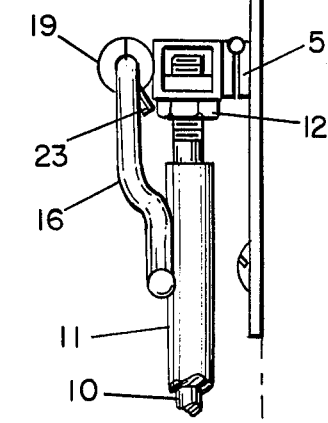

BICYCLE WALL RACK

This invention relates to a bicycle rack mountable on a wall surface and having a pair of spaced projecting forks rotatable from a collapsed inoperative position adjacent the wall surface to a horizontal projecting position whereat a bicycle may engage with and be erectly supported by the forks, and a bar being associated with the forks for coaction with a latch assembly for locking the forks in supporting position.

The principal object of the present invention is to provide a wall mounted collapsible bicycle rack having bicycle supporting forks and a bar and latch associated therewith for locking the forks in elevated bicycle supporting position.

Another object is the provision of a rack embodying a pair of forks hingedly connected to a wall surface and having an angularly extending bar associated therewith adapted to engage with a latch mechanism arranged on a wall plate and having a gravitationally operated latching lever pivoted thereto whereby the bar and forks are lockable in extended bicycle supporting position.

A further object is to provide a wall mounted latching mechanism to receive an angularly extending bar on one end of a fork mounting tube and wherein a latching lever is pivotally mounted in the latching mechanism for gravitational movement to latching position and manual movement to open or unlatched position.

While various prior art bicycle supporting racks have been proposed, such as, U.S. Pat. Nos. to Jeffery 371,326, Martin 610,656, Sayer 618,999, and Pyott 619,344, these devices do not provide a sturdy collapsible support having a latching mechanism associated therewith for locking the rack in elevated bicycle supporting position and which latch may be readily released to collapse the rack.

These and other objects and advantages will be apparent as the specification is considered in connection with the accompanying drawings, wherein FIG. 1 is a perspective view of my improved collapsible rack showing a bicycle supported in elevated position thereon;

FIG. 3 is a side elevation, partly in section, of the bar and supporting forks, and latching mechanism, as viewed from the right of FIG. 1; and FIG. 4 is a side elevation, partly in section, of the bar, and supporting forks in collapsed position, and the latching mechanism in raised position for unlatching.

Figure 1:
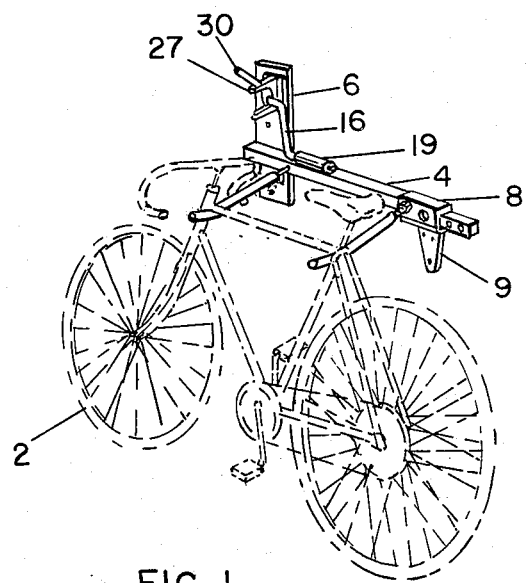

Referring more particularly to the drawings, wherein similar reference characters designate like parts throughout the several views, numeral 1 designates generally a collapsible supporting rack for cycles and the like, such as a bicycle 2, shown in dotted lines in a vertical and elevated supporting position thereon when the rack is attached to wall surface 3.

The rack includes an elongated horizontally arranged bar 4 which may be of metal and generally square in cross section. One end of the bar is hingedly connected, as at 5, to a plate 6 which is flat and suitably secured to wall 3, as at 7. The other end of bar 4 has a square shaped sleeve 8 slidably arranged thereon which is hingedly connected, as at 9, to wall 3 so that the bar extends generally horizontally therealong. Adjacent one end of bar 4 and projecting laterally therefrom is a rod 10 having a slightly upturned outer end 11, with the rod being threadedly and removably connected to the bar, as at 12. A second rod 10', similar in shape and length to rod 10, is threadedly and removably connected to sleeve 8, as at 12'. Each rod may have a protective rubber or plastic casing or cover 13 thereon to prevent the bicycle from being damaged when supported thereon, as presently will be described.

Bar 4 is preferably provided with a series of spaced apertures 14 at the sleeve 8 mounted end, and the latter is similarly apertured, as at 15, so that the rod 10' may threadedly extend through two alined apertured 14 and 15 to anchor the sleeve at a predetermined and suitable spacing from the companion rod 10, but yet permit of rod 10' being removed therefrom and the sleeve slidably adjusted relative to bar 4 to vary the spacing of the rods, in an obvious manner.

As the bar 4 and supporting rods 10 – 10' is hingedly and pivotally attached to wall 3, in inoperative or collapsed position the rods will extend vertically downwardly in the FIG. 4 position extending generally parallel to wall 3, from which position it may be elevated to the horizontal bicycle supporting position, now to be described.

Figure 2:
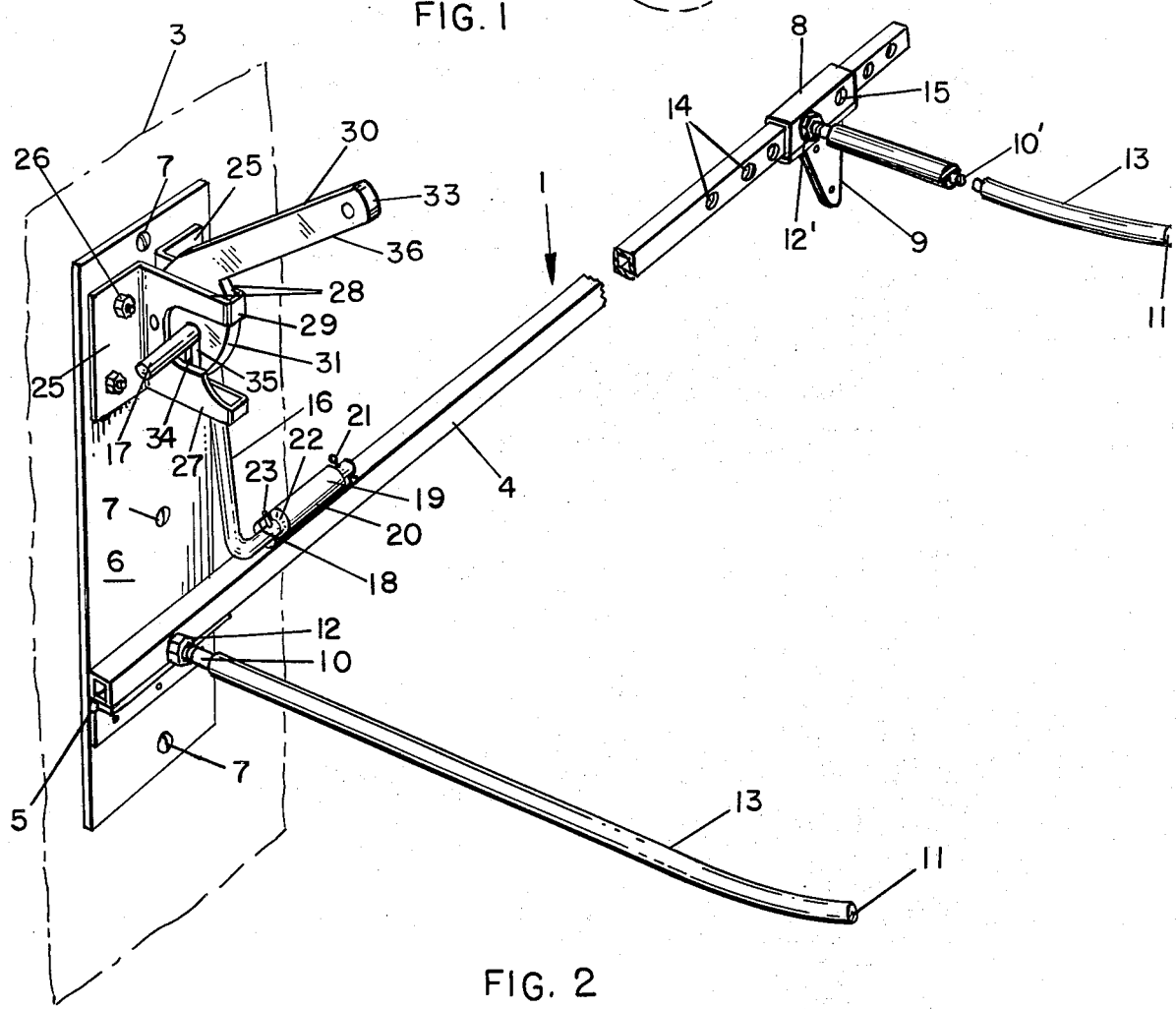
FIG. 2 is a perspective view, partly in section, of the pivotally mounted bar and supporting forks and associated latching mechanism in elevated horizontal bicycle supporting position.

A lifting bar 16 having oppositely and laterally extending end portions 17 and 18 thereon has the lowermost end 18 extending through a sleeve 19 fixedly secured to one face of bar 4, as at 20, and extending therealong, as best shown in FIGS. 1 and 2. End 18 is retained in sleeve 19 by a cotter pin 21 at one end for rotational movement therein, and the opposite end of the sleeve is cut away, as at 22, to accommodate and coact with a pin 23 on and extending from end 18. Thus, in the collapsed FIG. 4 position, the bar 16 and pin 23 thereon will extend downwardly, so that the end 17 thereon may be grasped and operated and moved outwardly and upwardly until the pin 21 engages and is stopped by the uppermost end of the cut away 22, which then enables the bar 4 and lifting rods 10 – 10' to be elevated to the horizontal supporting position, with the pin 21 serving as a stop to retain this assembly thereat.

A latching assembly for retaining the lifting arm 16 in elevated position is secured to wall plate 6 in spaced relation above bar 4, and includes a T-shaped latch member 24 with the flat laterally extending base portions 25 being secured to plate 6, as at 26, so that the leg portion 27 thereof projects outwardly therefrom. The latch member may be stamped or shaped from metal so that the T-shaped leg portion 27 includes spaced parallel walls 28 closed at the front, as at 29, to provide a socket within which the arcuately-shaped lower end 31 of a lever 30 is pivotally mounted, as at 32, so that a handle 33 thereon will project upwardly and outwardly and will pivot therein. Leg 27 of latch member is formed with a cut-out 34 into which the lateral upper end 17 of lifting bar 16 will project in its uppermost FIGS. 2 and 3 position, and a radial slot 35 in lower end 31 of lever 30 will be alined with and receive the end 17 therein when the lever has been moved to its elevated FIG. 4 position. Thereafter, the release of lever handle 33 permits the lever to drop by gravity outwardly and downwardly until the outermost edge 36 thereon engages with and is stopped by the closed upper end of leg portion 27, so that the lifting arm end 17 is locked withing the latch by slot 35, as best shown in FIGS. 2 and 3. In this position, the rods 10 – 10' are latched in horizontal position to receive a cycle thereon, as shown in FIG. 1. If desired, suitable lock means, not shown, may be utilized to lock the cycle in its upright supported postion.

When the cycle is lifted from the supporting rods, the lever handle 33 is manually moved upwardly and rearwardly, or by pulling on a line, not shown, attached to an aperture 37 in the outer end thereof, to open slot 35 and permit the upper end 17 of lifting bar to move gravitationally outwardly and downwardly therefrom and the cut-out 34 in the latch member until the lifting bar and supporting rods reach the inactive or collapsed downwardly extending position of FIG. 4.

Should the supporting rods require replacing, either or both may be unscrewed and removed from the supporting bar or the sleeve 8 thereon. In addition, the distance between the rods may be varied by unscrewing the threaded connection between rod 10' and sleeve 8 and slidably adjusting the latter on the bar to accommodate different size cycles.

While a preferred embodiment of my cycle supporting collapsible rack has been shown and described, it is to be understood that various changes and improvements may be made therein without departing from the scope and spirit of the appended claims.

What I claim is:

1. a collapsible rack for removably supporting cycles relative to a vertical wall surface comprising an elongated horizontal bar, outwardly projecting spaced rods, one of said rods being removably connected to said bar, and the other of said rods being removably connected to a sleeve, said sleeve being slidably arranged on said bar, a latch assembly plate secured to said wall surface adjacent one of said rods, one end of said horizontal bar being hinged to said plate, said sleeve being hinged to said wall surface, a latch member on said plate and having a recess therein, lifting bar means pivotally mounted on said bar and engageable with said latch member, and a latching lever pivotally mounted on said latch member and having a slot therein for receiving said lifting bar when the latter is elevated relative thereto whereby said lifting bar, horizontal bar and lifting rods are latched in horizontal elevated position to receive a cycle thereon.

2. In a collapsible rack according to claim 1, wherein said lifting bar means has opposed laterally extending ends, one of said ends being rotatably journalled in said horizontal bar, and the other of said ends being receivable in said latch member recess and the slot in said latching lever.

3. In a collapsible rack according to claim 2, wherein the journal on said horizontal bar for said lifting bar coacts with pin means on said lifting bar end to enable said lifting bar and said horizontal bar and rods being elevated into latching position.

4. In a collapsible rack according to claim 1, wherein the sleeve on said horizontal bar is apertured and one of said supporting rods is arrangeable therein whereby said rod may be moved and adjusted relative to said other rod.

5. In a collapsible rack according to claim 4, wherein said horizontal bar is apertured adjacent one end whereby one of the apertures in said sleeve may be selectively alined therewith to effect adjustable mounting of said one rod.

6. In a collapsible rack acording to claim 1, wherein said supporting rods have upturned outer ends and have protective covering thereon.

7. In a collapsible rack according to claim 1, wherein said latch member projects forwardly from said plate and has a spaced wall socket therein, and said latching lever extends into said socket and is pivoted to said latching member.

8. In a collapsible rack according to claim 6, wherein said latching lever has a manually movable handle and is engageable with said latch member to limit its downward pivotal movement.

9. In a collapsible rack according to claim 7, wherein the recess in said latch member opens into the front thereof, and the slot in the lower end of said latching lever is movable thereinto whereby one end of said lifting bar extends into said recess and slot so that rotational movement of said lever latches said lifting bar in elevated position.

* * * * *